United States Patent [19]
Fujie et al.

[11] Patent Number: 4,937,488
[45] Date of Patent: Jun. 26, 1990

[54] VIBRATION WAVE MOTOR

[75] Inventors: Naofumi Fujie; Yasuo Kuwabara, both of Nagoya, Japan

[73] Assignee: Aisin Seiki Kabushiki Kaisha, Aichi, Japan

[21] Appl. No.: 291,887

[22] Filed: Dec. 29, 1988

[30] Foreign Application Priority Data

Dec. 29, 1987 [JP] Japan .................. 62-336079

[51] Int. Cl.$^5$ ........................... H01L 41/08
[52] U.S. Cl. .................................. 310/323
[58] Field of Search .................. 310/323, 328

[56] References Cited

U.S. PATENT DOCUMENTS

| 4,484,099 | 11/1984 | Kawai et al. | 310/323 X |
| 4,645,964 | 2/1987 | Hiramatsu et al. | 310/328 X |
| 4,672,256 | 6/1987 | Okuno et al. | 310/323 |
| 4,678,956 | 7/1987 | Izukawa et al. | 310/323 |

FOREIGN PATENT DOCUMENTS 0054883  3/1986  Japan ................... 310/323

Primary Examiner—Mark O. Budd
Attorney, Agent, or Firm—Sughrue, Mion, Zinn, Macpeak & Seas

[57] ABSTRACT

A vibration wave motor includes a housing made up of a base housing member having an inner housing and an outer housing secured on opposite sides thereof to define two chambers. First and second stator members are secured to the inner and outer housings in each chamber respectively, and first and second rotor members secured to a spindle rotatably mounted in the housing are disposed in the respective chambers in contact with the first and second stator members, respectively. First and second spring members are provided for pressing the respective rotors and stators together and first and second adjusting members are provided for adjusting the pressure applied by the first and second spring members.

7 Claims, 5 Drawing Sheets

VIBRATION WAVE MOTOR

BACKGROUND OF THE INVENTION

The present invention relates to a vibration wave motor driven by a travelling wave, and more particularly relates to a motor structure for increasing the output torque.

Japanese Laid-open Patent Publication No. 61-277384 published on Dec. 8, 1986 discloses a vibration wave motor. FIG. 6 is a cross-sectional view of such a conventional vibration wave motor.

Referring now to FIG. 6, the conventional wave motor is explained. A stator (13) is fixed to a housing (11) by a support plate (10). A rotor (12) is fixed to a spindle (6) by a support plate (9). The spindle (6) is rotatably supported by bearings (7) which are fixed to the housing (11). The stator (13) is comprised of an intermediate elastic member (3), a pair of ring-shaped piezoelectric members (2a, 2b) and a pair of elastic members (1a, 1b). The piezoelectric member (2a) and the elastic member (1a) are stacked and adhered onto one side of the intermediate elastic member (3). Further, the piezoelectric member (2b) and the elastic member (1b) are stacked and adhered onto the other side of the intermediate elastic member (3). The stator (13) is inserted into a hollow portion of the rotor (12). The rotor (12) comprises a pair of friction members (5a, 5b) and a pair of supporting members (4a, 4b). The stator (13) is pinched by the supporting members (4a, 4b). Further the rotor (12) is pressed to the stator (13) by the spring (8) along an axial direction of the spindle (6).

Further, each piezoelectric member (2a, 2b) includes two drive elements. These two drive elements are mutually shifted along the circumferential direction of the piezoelectric members (2a, 2b) with a proper interval corresponding to $\frac{1}{4}$ the wave length of the travelling wave. When a pair of A.C. signals with 90° difference in phase are supplied to the piezoelectric member (2a, 2b), a pair of travelling waves are generated on both elastic members (1a, 1b). When the travelling waves are generated, the rotor (12) is rotated according to circulation of the travelling waves.

However, there are no adjusting means for adjusting the pressures which are applied to both sides of the intermediate elastic member (3) in the conventional vibration wave motor. Accordingly, vibration characteristics on opposite sides of the intermediate elastic member (3) can not be harmonized. Therefore, the rotor (3) might generate squealing and the output torque might be reduced.

SUMMARY OF THE INVENTION

Accordingly, one of the objects of the present invention is to solve the above mentioned conventional drawbacks.

Another object of the present invention is to adjust the pressures between the rotors and the stators easily.

Still another object of the present invention is to adjust the pressures between the rotors and the stators independent.

A further object of the present invention is to adjust the pressures between the rotors and the stators externally from outside the motor.

To achieve the above objects, and in accordance with the principles of the invention as embodied and broadly described herein, the vibration wave motor comprises a housing member including a housing base, an outer housing and an inner housing; a bearing member mounted on the inner housing; a spindle member rotatably supported by the bearing member; a first stator member fixed to the housing base; a first rotor member engaged with the spindle member in order to rotate integrally with the spindle member; a first pressing member for adjusting applying a pressure between the first stator member and the first rotor member; a first adjusting member for adjusting the pressure applied by the first pressing means; a second rotor member fixed to the housing base; a second rotor member engaged with the spindle member in order to rotate integrally with the spindle member; a second pressing member for applying a pressure between the second stator member and the second rotor member; and a second adjusting member for adjusting the pressure applied by the second pressing member.

BRIEF DESCRIPTION OF THE DRAWINGS

The accompanying drawings, which are incorporated in and constitute a part of the specification, illustrate an embodiment of the invention, and, together with the description, serve to explain the principles of the invention wherein.

DESCRIPTION OF THE PREFERRED EMBODIMENTS

Figure 1:
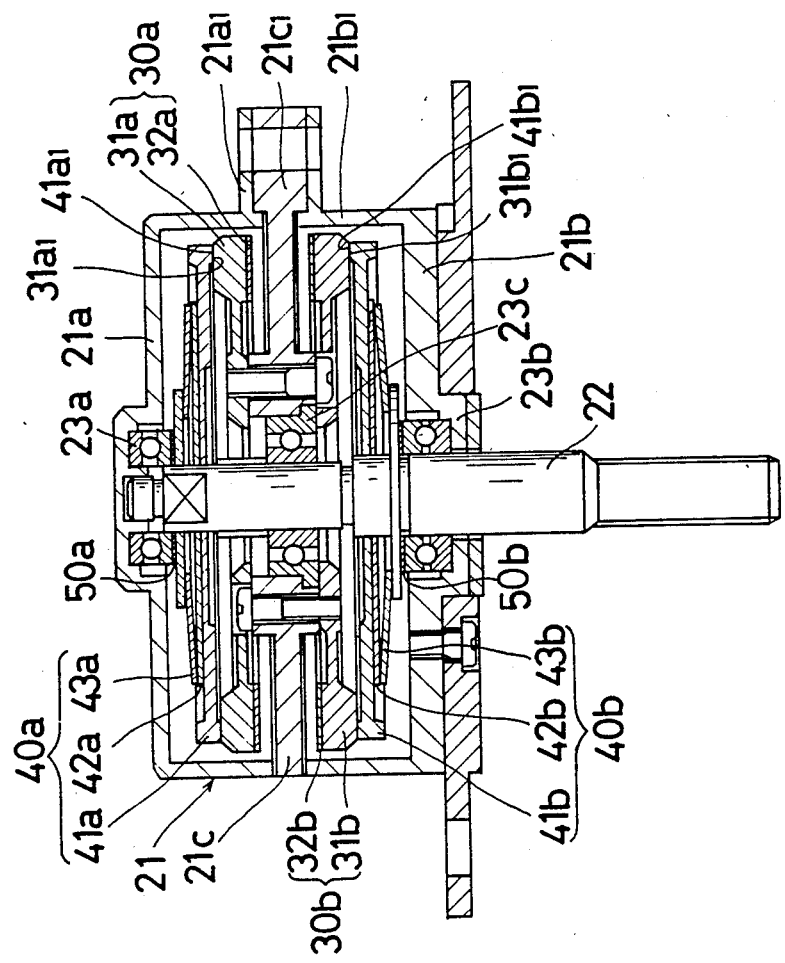
FIG. 1 is a cross-sectional view of a vibration motor taken along the line X—X in FIG. 2.

Referring now to FIG. 1, a construction of a vibration wave motor according to the first embodiment is explained.

A housing (21) includes an outer housing (21a), an inner housing (21b) and a housing base (21c). The housing base (21c) is positioned between the outer housing (21a) and the inner housing (21b). The outer housing (21a) and the housing base (21c) accommodate a first rotor (40a), and the inner housing (21b) and the housing base (21c) accommodate a second rotor (40b). The outer housing (21a), the inner housing (21b) and the housing base (21c) have four related flanges (21a1, 21b1, 21c1), (21a2, 21b2, 21c2), (21a3, 21b3, 21c3) and (21a4, 21b4, 21c4) respectively. The outer housing (21a), the inner housing (21b) and the housing base (21c) are integrated by four pairs of screws (not shown) and nuts (not shown).

A spindle (22) is rotatably supported by three bearings (23, 23b, 23c). The bearing (23a) is mounted in the center of the outer housing (21a). The bearing (23b) is mounted in the center of the inner housing (21b). The bearing (23c) is mounted in the center of the housing base (21c).

A center part of the first stator (30a) is fixed to the housing base (21c) by a screw. The outer circumferential part of the first stator (30a) operates as a ring-shaped vibration member (31a). A plurality of projections (31a1) are provided integrally on one side of the vibration member (31a), a ring-shaped piezoelectric member (32a) is adhered by a conductive adhesive.

Figure 3:
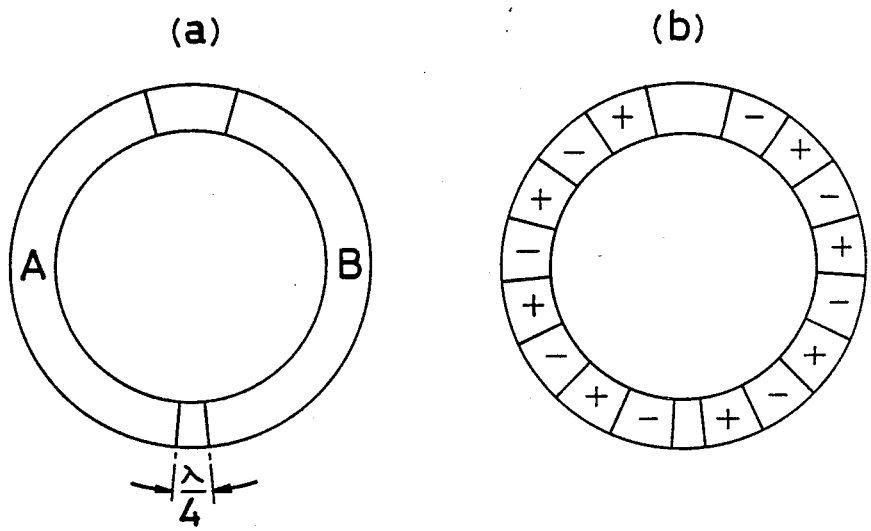
FIGS. 3(a) and 3(b) are plane views showing a polarized piezoelectric member according to the first embodiment of the present invention.
Figure 6:
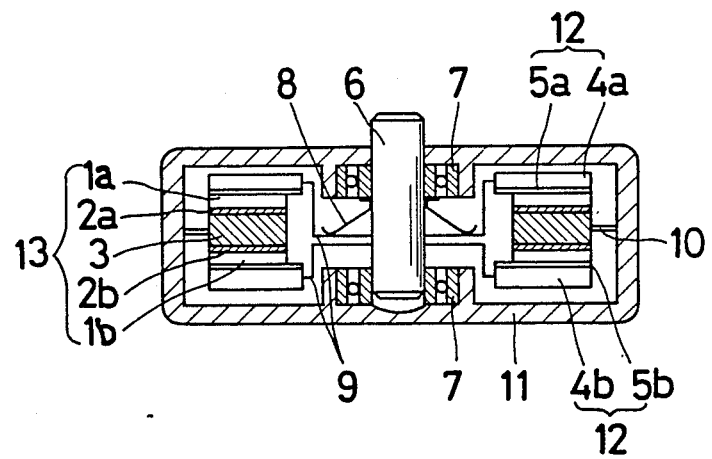
FIG. 6 is a cross-sectional view showing a conventional vibration wave motor.

As shown in FIG. 3(a), the piezoelectric member (32a) includes two driving elements (A, B). These elements (A, B) are separated by a proper interval which corresponds to ¼ the wave length of the traveling wave which is generated on the vibration member (31a). Further, these driving elements (A, B) are polarized as shown in FIG. 3(b).

Referring again to FIG. 1, the first rotor (40a) is explained. The first rotor (40a) rotates together with the spindle (22) but is mounted slidably along the axial direction of the spindle (22). The first rotor (40a) is pressed toward the first stator (30a) by a cone spring (43a) through a rubber seat (42a). The rubber seat (42a) absorbs vibrations from the first stator (30a). A disc (41a) of the first rotor (40a) includes a ring-shaped friction portion (41a1). The ring-shaped friction portion (41a1) is in contact with the projections (31a1) of the first stator (30a).

Similar to the first stator (30a), a center part of the second stator (30b) is fixed to the housing base (21c) by a screw. The second stator (30b) comprises the same members as the first stator (30a). The outer circumferential part of the second stator (30b) operates as a ring-shaped vibration member (31b). A plurality of projections (31b1) are provided integrally on one side of the vibration member (31b). Tops of the projections (31b1) are in touch with the second rotor (40b). On the opposite side of the vibration member (31b), a piezoelectric member (32b) is adhered by a conductive adhesive. The piezoelectric member (32b) is the same as the piezoelectric member (32a) except for inverted polarization.

The second rotor (40b) is the same as the first rotor (40a). The second rotor (40b) rotates together with the spindle (22) but is mounted slidably along the axial direction of the spindle (22). The second rotor (40b) is pressed toward the second stator (30b) by a cone spring (43b) through a rubber seat (42b). The rubber seat (42b) absorbs vibrations from the second stator (30b). A disc (41b) of the second rotor (40b) includes a ring-shaped friction portion (41b1). The ring-shaped friction portion (41b1) is in contact with the projections (31b1) of the second stator (30b).

An outer shim (50a) is inserted between the bearing (23a) and the cone spring (43a) in order to adjust the pressure between the first stator (30a) and the first rotor (40a). Accordingly, the pressure between the first stator (30a) and the first rotor (40a) can be adjusted by exchanging the outer shim (50a) for another shim of different thickness. Further, an inner shim (50b) is inserted between the bearing (23b) and the cone spring (43b) in order to adjust the pressure between the second stator (30b) and the second rotor (40b). Accordingly, the pressure between the second stator (30b) and the second rotor (40b) can be adjusted by exchanging the inner shim (50b) for another shim of different thickness. Thus, each pressure between stators (30a, 30b) and rotors (40a, 40b), respectively, can be adjusted without mutual interference, since the first and the second rotors (40a, 40b) are mounted slidably along the axial direction of the spindle (22).

The vibration wave motor which is explained above is built up as follows:

First of all, the first stator (30a) is fixed to the housing base (21c) by the screw. Next, the spindle (22) is inserted into the bearing (23c) which is fixed to the housing base (21c). Then the disc (41a), the rubber seat (42a), the cone spring (43a) and the outer shim (50a) are inserted in the spindle (22). After that, the outer housing (21a) is fixed to the housing base (21c).

At this stage, a pair of A.C. signals are applied to the piezoelectric member (32a) of the first stator (30a). Then a travelling wave is generated on the vibration member (31a). The first rotor (40a) starts rotating as soon as the travelling wave is generated on the vibration member (31a). The thickness of the outer shim (50a) is adjusted by exchanging the shim with other shims having different thicknesses in order to maximize an output torque while the first rotor (40a) is rotating.

Secondly, the second stator (30b) is fixed to the housing base (21c) on the opposite side relative to the first stator (30a) by a screw. Next, the disc (41b), the rubber seat (42b), the cone spring (43b) and the outer shim (50b) are inserted on the spindle (22). After that, the inner housing (21b) is fixed to the housing base (21c).

At this stage, the A.C. signals are applied to the piezoelectric members (32a, 32b). Then the independent travelling waves in the same rotational direction are generated on each vibration member (31a, 31b). The first and second rotors (40a, 40b) start rotating as soon as the travelling waves are generated on the vibration members (32a, 31b). The thickness of the inner shim (50b) is adjusted by exchanging the shim with other shims having different thicknesses in order to harmonize the vibration characteristic of the second stator (30b) with that of the first stator (30a).

When the thickness of the inner shim (50b) is adjusted properly, and the vibration characteristics of the first and second stators (30a, 30b) are harmonized, the output torque becomes almost twice as much as the output torque based on the single first stator (30a) and rotor (40a). Further, the squealing of the vibration wave motor can also be stopped.

In the above embodiment, the first stator (30a) is the same as the second stator (30b), and the first rotor (40a) is the same as the second rotor (40b). Therefore, standardization of the parts can be obtained and the variety of parts can be reduced.

Figure 2:
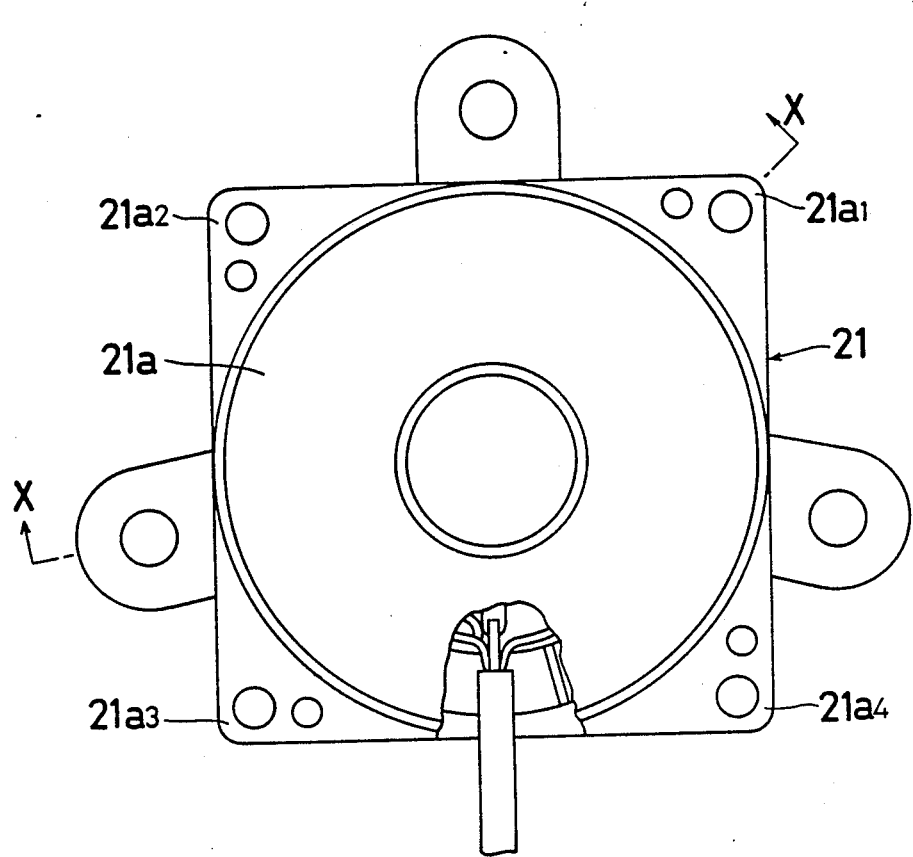
FIG. 2 is a plan view of a vibration motor according to a first embodiment of the present invention.

Meanwhile, the inner and outer shims (50a, 50b) are utilized for adjusting the pressures between the stators (30a, 30b) and the rotors (40a, 40b) in the above embodiment. However, the present invention is not limited to the above embodiment shown in FIGS. 1, 2 and 3.

Figure 4:
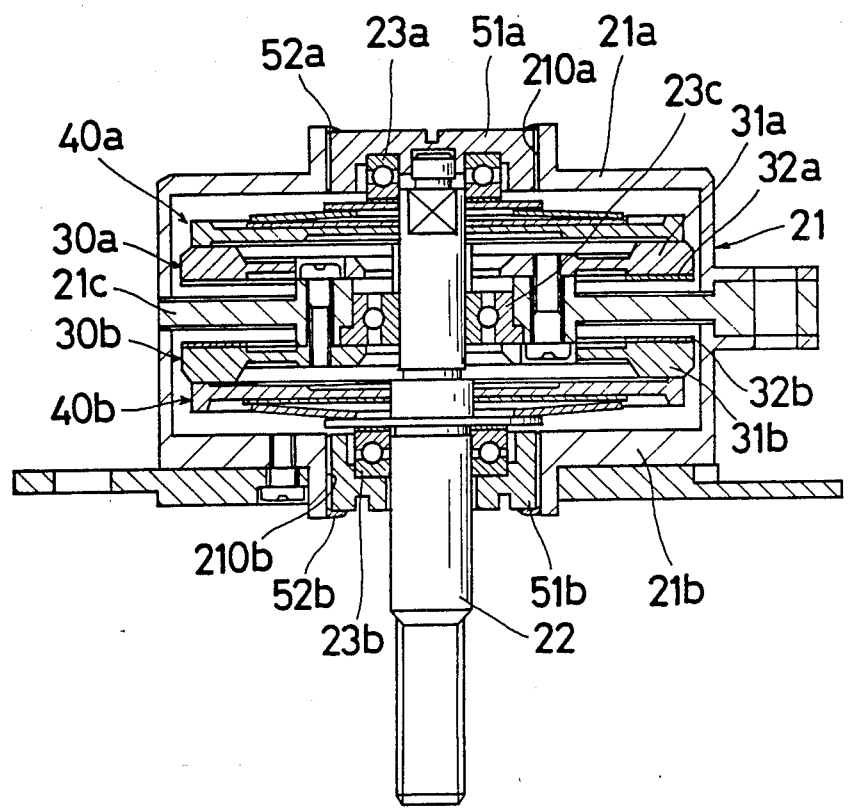
FIG. 4 is a cross-sectional view of a vibration motor taken along the line X—X in FIG. 2 according to a second embodiment of the present invention.

Referring now to FIG. 4, the second embodiment is explained. The second embodiment is one modification of the present invention. Accordingly, like reference characters in FIG. 4 designate like or corresponding parts in FIG. 1, Further, only some differences between first and second embodiments are explained in this explanation.

The outer housing (21a) has a central bore (210a). An outer screw plate (51a) is provided in the central bore (210a). The bearing (23a) is mounted on the outer screw plate (51a). The spindle (22) is slidably supported by the bearings (2ea, 23c) along the axial direction of the spindle (22), but displacement of the spindle is limited between the outer screw plate (51a) and the bearing (23b). The pressure between the first stator (30a) and the first rotor (40a) is adjusted by rotating the outer screw plate (51a) in the central bore (210a).

Similar to the outer housing (21a), the inner housing (21b) has a central bore (21b). An inner screw plate (51b) is provided in the central bore (210b). The bearing (23b) is mounted on the inner screw plate (51b). The pressure between the second stator (30b) and the second rotor (40b) is adjusted by rotating the inner screw plate (51b) in the central bore (210b).

In the second embodiment, each pressure between the stators (30a, 30b) and the rotors (40a, 40b), respectively, can be adjusted independently without any mutual interference similar to the first embodiment. Therefore, the same method as the first embodiment can be executed for adjusting the pressures between the stators (30a, 30b) and the rotors (40a, 40b). Further, each pressure between the stators (30a, 30b) and the rotors (40a, 40b), respectively, can be adjusted externally from the outer housing (21a) and the inner housing (21b) in the second embodiment. It is preferred that resins (52a, 52b) are poured into the gaps around the screw plates (51a, 51b) after adjusting the pressures between stators (30a, 30b) and the rotors (40a, 40b) in order to prevent the screw plates (51a, 51b) from loosening.

Figure 5:
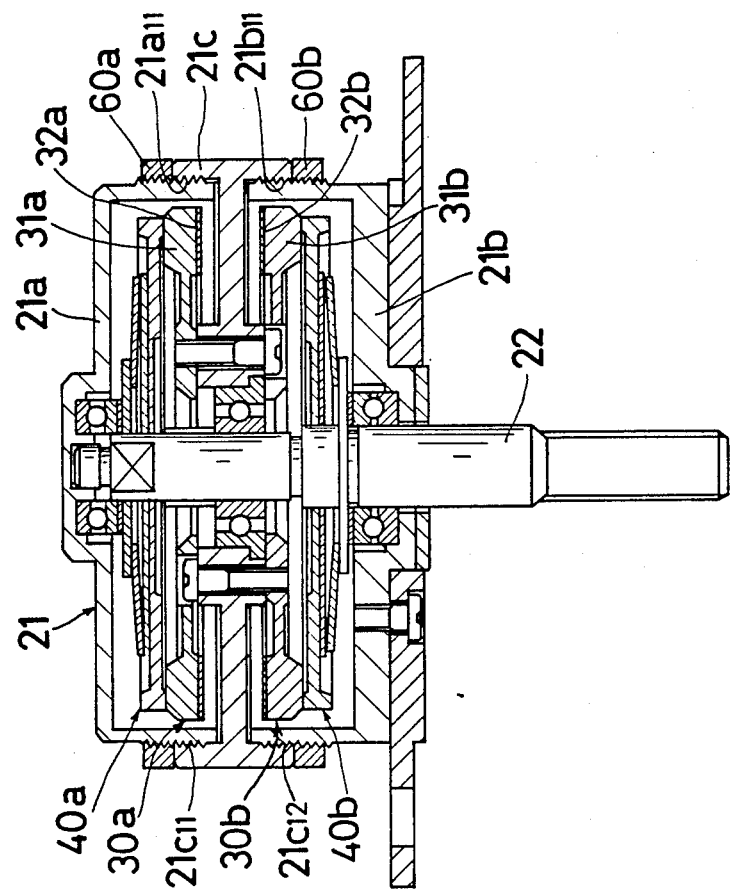
FIG. 5 is a cross-sectional view of a vibration motor taken along the line X—X in FIG. 2 according to a third embodiment of the present embodiment.

Referring now to FIG. 5, a third embodiment, which is a modification of the present invention, is explained. In the third embodiment, the pressures between the stators (30a, 30b) and the rotors (40a, 40b) are adjusted by axial displacements of the first and second housing (21a, 21b) with respect to the housing base (21c). Like reference characters in FIG. 5 designate like or corresponding parts in FIG. 1. In this explanation, only some differences between the first embodiment and the third embodiment are explained.

The outer housing (21a) does not have the flanges (21a1, 21a2, 21a3, 21a4), and therefore, the outer housing (21a) has an almost cylindrical shape. Further, the inner housing (21b) does not have the flanges (21b1, 21b2, 21b3, 21b4), and therefore, the inner housing (21b) has an almost cylindrical shape. Furthermore, the housing base (21c) does not have flanges (21c2, 21c2, 21c3, 21c4) but has a T-shaped flange with two screw portions (21c11, 21c12).

The outer housing (21a) is fixed to the housing base (21c) by a screw portion (21a11) which is provided on a side of the outer housing (21a). The screw portion (21a11) on the outer housing (21a) is threaded into the screw portion (21c11) on the housing base (21c). Further, a locking member (60a) is also threaded onto the screw portion (21a11) in order to prevent the outer housing (21a) from rotating.

Similar to the outer housing (21a), the inner housing (21b) is fixed to the housing base (21c) with a screw portion (21b11) which is provided on a side of the inner housing (21b). The screw portion (21b11) on the inner housing (21b) is threaded into the screw portion (21c12) on the housing base (21c). Further, a locking member (60b) is threaded onto the screw portion (21b12) in order to prevent the inner housing (21b) from rotating.

In the third embodiment, each pressure between the stators (30a, 30b) and the rotors (40a, 40b), respectively, can be adjusted independently without any mutual interference similar to the first and second embodiments. Therefore, the same method as the first embodiment can be executed for adjusting the pressures between the stators (30a, 30b) and the rotors (40a, 40b). Further, each pressure between the stators (30a, 30b) and the rotors (40a, 40b), respectively can be adjusted externally by rotation of the outer housing (21a) and inner housing (21b) relative to the housing base.

In the third embodiment, three or more pairs of the stator and the rotor can be stacked because each pressure between a stator and a rotor can be adjusted by rotating each housing. Accordingly, the output torque of the vibration wave motor can be increased more than triple the output torque based on a single first stator (30a) and rotor (40a).

Various modifications may be made in the present invention without departing from the scope or spirit of the invention.

What is claimed is:

1. A vibration wave motor comprising:
   a housing member including a housing base, first and second housings secured to opposite sides of said base;
   a bearing member mounted on the housing base;
   a bearing member rotatably supported by the bearing member;
   a spindle member rotatably supported by the bearing member;
   a first stator member fixed to one side of the housing base;
   a first rotor member engaged with the spindle member in order to rotate together with the spindle member;
   a first pressing member for applying a pressure between the first stator member and the first rotor member;
   a first adjusting member for adjusting the pressure applied by the first pressing means;
   a second stator member fixed to the opposite side of the housing base;
   said first and second stators being separate from each other and fixed to said base for independent vibration relative to each other;
   a second rotor member engaged with the spindle member in order to rotate together with the spindle member;
   a second pressing member for applying a pressure between the second stator member and the second rotor member; and
   a second adjusting member for adjusting the pressure applied by the second pressing member.

2. A motor in claim 1 wherein the first pressing member includes a first spring member inserted between the outer housing and the first rotor, and the first adjusting member includes a first shim member inserted between the outer housing and the first spring member.

3. A motor in claim 1 wherein the second pressing member includes a second spring member inserted between the second adjusting member and the second rotor, and the second adjusting member includes a second shim member inserted between the inner housing and the second spring member.

4. A motor in claim 1 wherein the first adjusting member includes a first displacing member provided on the outer housing member for displacement along an axial direction of the spindle member, and the first pressing member includes a first spring member inserted between the first displacing member and the first rotor member.

5. A motor in claim 1 wherein the second adjusting member includes a second displacing member provided on the inner housing member for displacement along an axial direction of the spindle member, and the second pressing member includes a second spring member inserted between the second displacing member and the second rotor member.

6. A motor in claim 1 wherein the first adjusting member includes a screw portion provided on the outer housing for displacement of the outer housing in an axial direction along the spindle member, and the first pressing member includes a first spring member inserted between the outer housing and the first rotor member.

7. A motor in claim 1 wherein the second adjusting member includes a screw portion provided on the inner housing for displacement of the inner housing in an axial direction along the spindle member, and the second pressing member includes a second spring member inserted between the inner housing and the second rotor member.

* * * * *